United States Patent Office 3,778,448
Patented Dec. 11, 1973

3,778,448
MANUFACTURE OF 1,2,3,3-TETRA-SUBSTITUTED
INDOLENINIUM SALTS
Hans-Juergen Sturm, Grunstadt, and Claus Tritschler, Heddesheim, Germany, assignors to Badische Anilin- & Soda-Fabrik Aktiengesellschaft, Ludwigshafen (Rhine), Germany
No Drawing. Filed Sept. 23, 1970, Ser. No. 74,880
Claims priority, application Germany, Sept. 30, 1969,
P 19 49 293.4
Int. Cl. C07d 27/56
U.S. Cl. 260—315                                              7 Claims

ABSTRACT OF THE DISCLOSURE

Manufacture of 1,2,3,3-tetra-substituted indoleninium salts by reacting a substituted indole with an alkylating agent in the presence of compounds of metals in Group II of the Periodic System. The compounds produced by the process of the invention are valuable intermediates for the manufacture of dyes and pesticides.

---

This invention relates to a process for the manufacture of 1,2,3,3-tetra-substituted indoleninium salts by reacting a substituted indole with an alkylating agent in the presence of compounds of metals in Group II of the Periodic System.

It is known that 1,2,3,3-tetramethylindoleninium salts may be made by reacting 2-methylindole or 2,3-dimethylindole with methyl halides (Liebigs Annalen der Chemie, Vol. 242, pp. 353 and 364 (1887)) or by reacting 2,3,3-trimethylindolenine with dimethyl sulfate (Berichte der Deutschen Chemischen Gesellschaft, Vol. 31, page 613 (1898)), and that the said salts may be converted by the action of alkalis to Fischer's Base (1,3,3-trimethyl-2-methylene indoline). These processes start from materials which are difficult to prepare or uneconomical in use. Attempts to start from 2-methylindole by completely methylating the same with dimethyl sulfate were not successful in producing the corresponding indoleninium salt, as the reaction mixture became resinous (Berichte der Deutschen Chemischen Gesellschaft, Vol. 57 (1924), page 146).

It is an object of this invention to provide a new process for the manufacture of a larger number of 1,2,3,3-tetra-substituted indoleninium salts in good yield and purity.

This and other objects are achieved and the manufacture of 1,2,3,3-tetra-substituted indoleninium salts of the general formula:

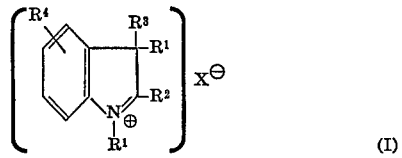

(I)

in which $R^1$ stands for an aliphatic radical, $R^2$ and $R^3$, which may be identical or different, each stand for an aliphatic or araliphatic radical or form, together with the adjacent carbon atoms, members of an alicyclic ring, $R^4$ stands for an aliphatic radical, a halogen atom, an alkoxy group, a nitro group or a hydrogen atom and X stands for the $-OSO_2R^5$, wherein $R^5$ stands for an aromatic radical, or X stands for the radical

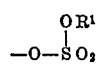

wherein $R^1$ has the meaning given above, by reacting substituted indoles with alkylating agents is advantageously carried out by reacting a substituted indole of the general formula:

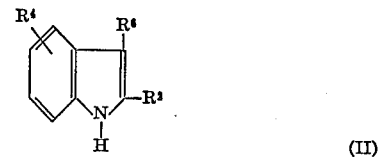

(II)

in which $R^3$ and $R^4$ have the meanings given above, $R^6$ has the meaning given above for $R^3$ and may also stand for a hydrogen atom, with an alkylating agent of the general formula:

$$R^1-X \qquad (III)$$

in which $R^1$ and X have the meanings given above, in the presence of oxides and/or salts of weak acids with metals in Group II of the Periodic System.

The reaction may be represented by the following formulae illustrating the use of 2,3-dimethylindole and dimethyl sulfate:

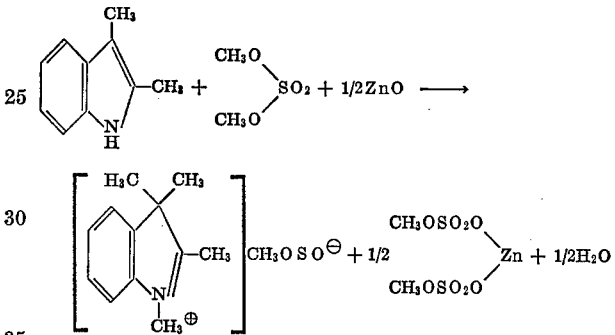

The process of the invention produces a greater number of 1,2,3,3-tetra-substituted indoleninium salts in good yield and purity by a simple and more economical route as compared with the previously known processes. In view of the prior art it is surprising that the alkylating agents used, in particular the dialkyl sulfates, produce such favorable results without any substantial resinification or decomposition of the reaction mixture.

The substituted indoles of the General Formula II may be produced by reacting the corresponding phenyl hydrazines with ketones such as acetone and methyl ethyl ketone. Preferred starting materials of Formula II and therefore preferred products of Formula I are those in which $R^2$ and $R^3$, which may be identical or different, each stand for an alkyl radical having from 1 to 6 carbon atoms, an aralkyl radical having from 7 to 12 carbon atoms or form, together with the adjacent carbon atoms, members of a 5- or 6-membered alicyclic ring, preferably a partially hydrogenated benzene ring, $R^4$ stands for an alkyl radical having from 1 to 4 carbon atoms, a chlorine atom, a bromine atom, an alkoxy group having from 1 to 4 carbon atoms, a nitro group or a hydrogen atom, and $R^6$ has the meanings given above for $R^3$ or may stand for a hydrogen atom. Where, in the starting material of Formula II, $R^6$ stands for a hydrogen atom, $R^3$ will have the same meaning as $R^1$ in the product of Formula I. The aforementioned radicals and ring may be substituted by groups and/or atoms which are inert under reaction conditions such as an alkyl or alkoxy group having from 1 to 4 carbon atoms, a nitro group or a chlorine atom.

The following indoles are suitable starting materials of Formula II:

2-methylindole, 2,3-dimethylindole, 2-benzylindole, 2-methyl-3-benzylindole; correspondingly substituted 5-chloro, 5-ethoxy, 4-bromo, 5-isobutyl and 5-nitro indoles; 1,2,3,4-tetrahydrocarbazole and carbazole.

The starting material of Formula II is reacted with an alkylating agent of the General Formula III in stoichiometric amounts or with an excess of alkylating agent preferably ranging up to 3.5 times the stoichiometric amount of alkylating agent required for the starting material of Formula II. The preferred alkylating agents of Formula III are those in which $R^1$ stands for an alkyl radical having from 1 to 3 carbon atoms and X stands for the radical $-OSO_2-R^5$, where $R^5$ stands for a phenyl or tolyl radical which may be substituted by any of the aforementioned atoms and/or groups which are inert under the reaction conditions, or where $R^5$ stands for the radical

where $R^1$ has the aforementioned preferred meaning. Examples of starting materials of Formula III which may be used are as follows:

dimethyl sulfate, dipropyl sulfate and diethyl sulfate and the methyl, ethyl or propyl esters of the following acids: benzenesulfonic acid, toluenesulfonic acid, 2,5-dimethylbenzenesulfonic acid, 4-chlorobenzenesulfonic acid and 4-methoxybenzenesulfonic acid.

During the reaction there are present as catalysts, oxides and/or salts of weak acids with metals in Group II or the 2nd main group or 2nd sub-group of the Periodic System, generally in quantities ranging from 1.5 to 2.1 moles for each mole of the starting material of Formula II. By weak acids we mean inorganic or organic acids having a dissociation constant of less than $10^{-4}$. Preferred suitable catalysts are appropriate compounds of zinc, cadmium, magnesium, calcium or barium, such as the acetates, borates, pyrophosphates, silicates, propionates, butyrates, glutarates, citrates, adipinates, benzoates, phthalates, cyclohexylacetates, palmitates and, in particular, the oxides and carbonates.

The reaction is usually carried out at a temperature of from 100 to 190° C. and preferably at a temperature of from 130° to 150° C. at atmospheric or elevated pressure, continuously or batchwise. The process may be effected for example as follows: A mixture comprising starting material of Formula II and catalyst is heated at the reaction temperature whilst the alkylating agent is added in portions over 30 minutes. The reaction mixture is maintained at the reaction temperature for a further 3 to 6 hours with thorough stirring and then cooled. The product may then be isolated in conventional manner, for example by dissolving the reaction mixture in water, neutralizing with sodium hydroxide or ammonia, carefully evaporating to dryness, extracting with absolute ethanol and evaporating the filtered alcoholic solution to dryness.

Usually, however, the indoleninium salt will be directly processed without isolation, for example by the ammonia or alkali solution, separation of the organic phase from the resulting two-phase system under nitrogen and fractional distillation of the said organic phase. Where 2,3-dimethylindole and dimethyl sulfate are used, for example, Fischer's Base will thus be obtained in a simple and economical manner.

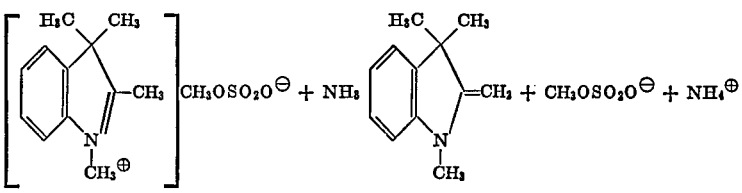

The compounds obtainable by the process of the invention are valuable intermediates for the manufacture of dyes and pesticides. For information on the use and, in particular, the manufacture of Fischer's Base see the aforementioned publications, Ullmann's Encyklopädie der technischen Chemie, Vol. 8, page 785, and German patent specification Nos. 410,487; 865,925 and 1,205,638.

The invention is illustrated by the following examples in which parts are by weight.

EXAMPLE 1

A mixture of 145.2 parts of 2,3-dimethylindole and 122 parts of zinc oxide is heated to 130° C. to produce a thin paste. To the stirred paste there are slowly added 336 parts of dimethyl sulfate and the resulting exothermic reaction maintains the temperature at from 140° to 150° C. without external heating. The mixture is then stirred for 4 hours at from 125° to 130° C. followed by cooling to 95–100° C., and 480 parts of cold water are added slowly.

The aqueous solution is then filtered, adjusted to pH 6–7 by the addition of aqueous sodium hydroxide and then evaporated to dryness at subatmospheric pressure at 50° C. The crushed residue is extracted with 400 parts of absolute ethanol at 40° C. leaving salts of zinc and sodium undissolved. The filtered extract is evaporated to dryness and completely freed from ethanol by treatment under subatmospheric pressure at 50° C.

There are thus produced 268 parts of 1,2,3,4-tetramethylindoleninium methyl sulfate (94% of the theory). This product is dissolved in water and converted with perchloric acid to the perchlorate, which has a melting point of 186–187° C. (with decomposition).

EXAMPLE 2

The reaction mixture obtained in Example 1, after cooling to 100° C. and diluting with 480 parts of water, is subjected to further processing without isolation of the product of Formula I. To the mixture there are added, at 30–35° C., 1.5 parts of piperidine as stabilizer and 480 parts of 25% aqueous ammonia. The initial precipitate of zinc hydroxide is completely redissolved after a short period. The supernatant layer of the resulting two-phase system is removed from the lower, aqueous layer and immediately transferred to a vacuum distillation unit. It is protected from atmospheric oxygen by a stream of nitrogen introduced throughout separation, which is effected by fractional distillation at 0.3 mm. Hg.

First runnings: 68–69° C., 3.12 parts
Main fraction: 69–72° C., 146.5 parts (Fischer's Base, 84% of the theory)
Residue: 9.8 parts The first runnings are added to the crude base of the next batch.

EXAMPLE 3

The reaction mixture from Example 1 used as starting material in Example 2 is diluted with 835 parts of cold water with stirring. 125 parts of gaseous ammonia are then introduced into the stirred solution at about 25° C. through a tube having a small outlet. The resulting two-phase system is worked up as described in Example 2. The yield of Fischer's Base is the same as that obtained in Example 2.

After separation of the crude base there remains an aqueous ammoniacal solution, from which the major portion of the ammonia may be recovered by heating to 90–100° C., zinc hydroxide being recoverable from the residue.

EXAMPLE 4

Example 1 is repeated except that 131 parts of 2-methylindole, 171 parts of zinc oxide and 442 parts of dimethyl sulfate are used. There are thus obtained 260 parts of 1,2,3,4-tetramethylindoleninium methyl sulfate (91% of the theory).

EXAMPLE 5

Example 1 is repeated except that 450 parts of methyl p-toluenesulfonate are used. There are thus obtained 108 parts of 1,2,3,4-tetramethylindoleninium - p - toluenesulfonate (35% of the theory).

EXAMPLES 6–8

Example 1 is repeated except that the following catalysts are used. The following yields of the product of Formula I as obtained in Example 1 are achieved:

| Ex. | Catalyst | Yield |
|---|---|---|
| 6 | 200 parts of calcium carbonate | 160 parts (56% of the theory). |
| 7 | 258 parts of cadmium oxide | 97 parts (34% of the theory). |
| 8 | 252 parts of zinc carbonate | 240 parts (84% of the theory). |

EXAMPLE 9

A mixture of 179.5 parts of 2,3-dimethyl-5-chloroindole and 163 parts of zinc oxide is heated to 150° C. 379 parts of dimethyl sulfate are slowly added with stirring. The resulting exothermic reaction maintains the temperature at 150° C. without any external heating. The mixture is stirred for a further 5 hours at 135–140° C., cooled to 95° C. and diluted with 700 parts of cold water, added slowly. The aqueous solution is filtered, adjusted to pH 6–7 by the addition of aqueous sodium hydroxide and then evaporated to dryness under subatmospheric pressure at 50° C. The crushed residue is extracted with 400 parts of absolute ethanol at 40° C. The filtered extract is evaporated to dryness and completely freed from ethanol by treatment under subatmospheric pressure at 50° C. There are thus obtained 266 parts of 1,2,3,3-tetramethyl-5-chloro-indolenium methyl sulfate (83.5% of the theory). This product is dissolved in water and converted with perchloric acid to the perchlorate, which has a melting point of 222–223° C. (with decomposition).

EXAMPLE 10

A mixture of 145.2 parts of 2,3-dimethylindole and 163 parts of zinc oxide is heated to 130° C. 464 parts of diethyl sulfate are then slowly added with stirring. The resulting exothermic reaction maintains the temperature at 140–150° C. without external heating. The mixture is stirred for a further 5 hours at 130° C., cooled to 100° C. and diluted with 640 parts of cold water, added slowly. The aqueous solution is filtered, adjusted to pH 6–7 by the addition of aqueous sodium hydroxide and evaporated to dryness under reduced pressure at 50° C. The crushed residue is extracted with 400 parts of absolute ethanol at 40° C. The filtered extract is evaporated to dryness and completely freed from ethanol by treatment under subatmospheric pressure at 50° C. There are thus obtained 258 parts of 1,3-diethyl-2,3-dimethylindoleninium ethyl sulfate (79% of the theory). This product is dissolved in water and converted with perchloric acid to the perchlorate which has a melting point of 123–135° C. (with decomposition).

EXAMPLE 11

A mixture of 171.2 parts of 1,2,3,4-tetrahydrocarbazole and 163 parts of zinc oxide is heated to 130° C. 379 parts of dimethyl sulfate are then slowly added with stirring. The resulting exothermic reaction maintains the temperature at 140–150° C. without external heating. The mixture is stirred for a further 4 hours at 125° to 130° C., cooled to 100° C. and diluted with 480 parts of cold water, added slowly. The aqueous solution is filtered, adjusted to pH 6–7 by the addition of aqueous sodium hydroxide and evaporated to dryness under subatmospheric pressure at 50° C. The crushed residue is extracted with 300 parts of absolute ethanol at 40° C. The filtered extract is evaporated to dryness and completely freed from ethanol by treatment under subatmospheric pressure at 50° C. There are thus obtained 210 parts of 9,11 - dimethyl-1,2,3,4-tetrahydrocarbazoleninium methyl sulfate (67.5% of the theory). This product is dissolved in water and converted with perchloric acid, to the perchlorate which has a melting point of 164–165° C. (with decomposition).

What we claim is:

1. A process for the manufacture of an 1,2,3,4-tetrasubstituted indoleninium salt of the formula

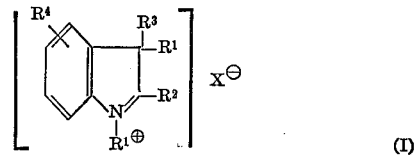

in which $R^1$ is alkyl of 1 to 3 carbon atoms, $R^2$ and $R^3$ each is alkyl of 1 to 6 carbon atoms or aralkyl of 7 to 12 carbon atoms or, when taken together with the adjacent carbon atoms, form a tetrahydrophenylene ring, $R^4$ is alkyl of 1 to 4 carbon atoms, hydrogen, chlorine, bromine, alkoxy of 1 to 4 carbon atoms or nitro, and X is one of the radicals

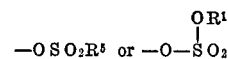

where $R^5$ is phenyl or tolyl and $R^1$ has the meaning given above, the aforementioned radicals and rings being unsubstituted or inertly substituted by alkyl of 1 to 4 carbon atoms, alkoxy of 1 to 4 carbon atoms, nitro or chlorine, which process comprises reacting at a temperature of from 100° C. to 190° C. a substituted indole of the formula:

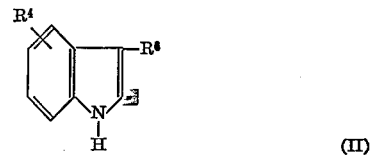

in which $R^2$ and $R^4$ have the meanings given above and $R^6$ has the meaning given above for $R^3$ and may further be a hydrogen atom, with an alkylating agent of the formula:

(III)         $R^1$—X in which $R^1$ and X have the meanings given above, in the presence of a catalyst consisting essentially of at least one compound selected from the class consisting of the oxides and salts of inorganic or organic acids having a dissociation constant of less than $10^{-4}$ with zinc, cadmium, magnesium, calcium or barium.

2. A process as claimed in claim 1 wherein the reaction is carried out in the presence of said catalyst present in an amount ranging from 1.5 to 2.1 moles for each mole of the starting material of the Formula II.

3. A process as claimed in claim 1 wherein the reaction is carried out at a temperature of from 130° to 150° C.

4. A process as claimed in claim 1 wherein the catalyst is zinc oxide.

5. A process as claimed in claim 1 wherein the catalyst is calcium carbonate.

6. A process as claimed in claim 1 wherein the catalyst is cadmium oxide.

7. A process as claimed in claim 1 wherein the catalyst is zinc carbonate.

References Cited

UNITED STATES PATENTS 2,069,662    2/1937    Treppenhauer ___ 260—319.1 X

JOSEPH A. NARCAVAGE, Primary Examiner

U.S. Cl. X.R.

260—319.1, 313.1, 376.16

UNITED STATES PATENT OFFICE
CERTIFICATE OF CORRECTION

Patent No. 3,778,448      Dated December 11, 1973

Inventor(s) Hans-Juergen Sturm and Claus Tritschler

It is certified that error appears in the above-identified patent and that said Letters Patent are hereby corrected as shown below:

Column 1, fourth line, "Grunstadt" should read -- Gruenstadt --.

Column 6, lines 34-40, formula (II),

" 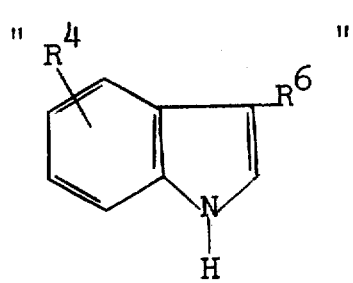 "  should read -- 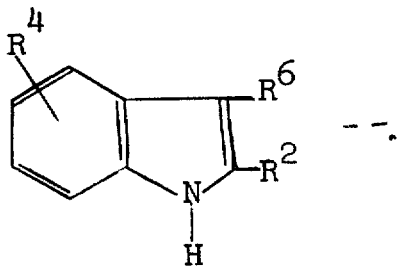 --.

Signed and sealed this 1st day of October 1974.

(SEAL)
Attest:

McCOY M. GIBSON JR.       C. MARSHALL DANN
Attesting Officer      Commissioner of Patents